C. B. PATCH.
FRICTION GEAR SHELL.
APPLICATION FILED OCT. 23, 1916.
1,235,369.
Patented July 31, 1917.
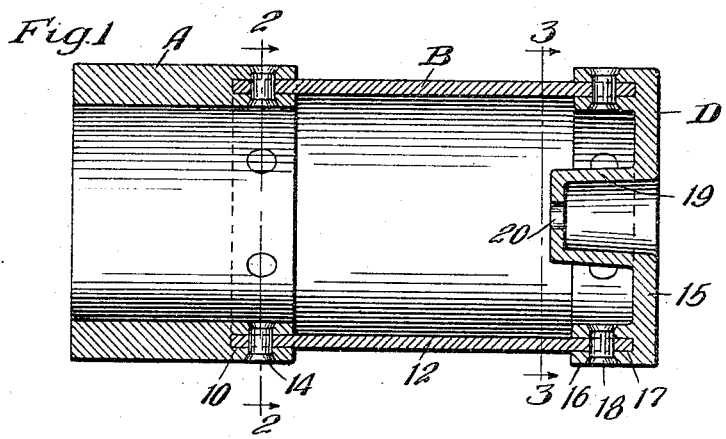
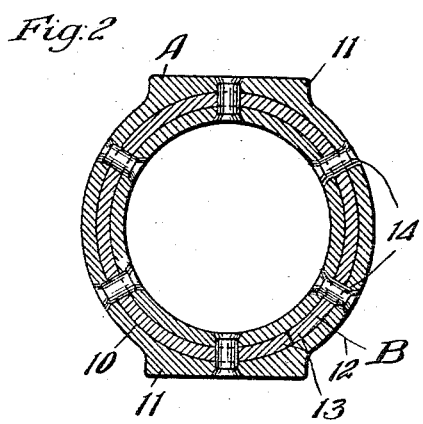
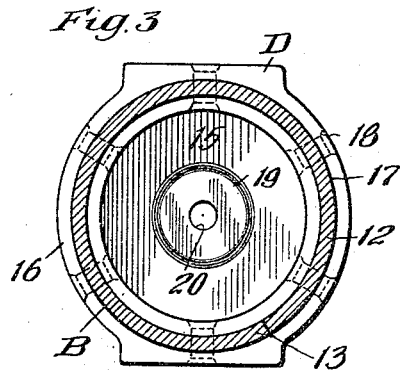
WITNESSES:
INVENTOR.
Calvin B. Patch
BY
HIS ATTORNEY

UNITED STATES PATENT OFFICE.

CALVIN B. PATCH, OF GLENELLYN, ILLINOIS, ASSIGNOR TO WILLIAM H. MINER, OF CHAZY, NEW YORK.

FRICTION GEAR-SHELL.

1,235,369.　　　　　Specification of Letters Patent.　　Patented July 31, 1917.

Application filed October 23, 1916.　Serial No. 127,113.

*To all whom it may concern:*

Be it known that I, CALVIN B. PATCH, a citizen of the United States, residing at Glenellyn, in the county of Dupage and State of Illinois, have invented a certain new and useful Improvement in Friction Gear-Shells, of which the following is a full, clear, concise, and exact description, reference being had to the accompanying drawings, forming a part of this specification.

This invention relates to improvements in friction gear shells.

The object of the invention is to provide a relatively inexpensive friction gear shell for draft gears wherein the parts subject to the greatest wear may be easily renewed.

Another object of the invention is to provide a friction gear shell composed partly of castings, the latter being of such form that they may be molded easier than heretofore and danger from foundry losses and defects minimized.

In the drawing forming a part of this specification, Figure 1 is a longitudinal central section of a friction gear shell embodying my invention. And Figs. 2 and 3 are transverse, vertical sections taken on the lines 2—2 and 3—3 respectively of Fig. 1.

In said drawing, A denotes a cast friction shell proper, B a tubular casing and D the follower, the three parts together constituting what is herein referred to broadly as the friction gear shell. As shown, the friction shell member A is of annular form and on its rear end is provided with an annular recess 10 as shown in Fig. 1. If desired, the member A may be provided with enlargements 11—11 on the top and bottom thereof forming upper and lower horizontal guiding and supporting surfaces. The tubular member B is preferably formed from a bent or rolled sheet of steel 12, the size of the sheet being such that, when rolled to cylindrical form, the edges 13 of the sheet will meet and the diameter correspond to the diameter of the annular recess 10 whereby the forward end of said tubular section may be inserted within said recess 10 and the members A and B securely riveted together as by the series of rivets 14—14. The rear end or follower D is also in the form of a casting and is provided with a rear flat wall 15 and a forwardly extended annular section 16. The latter is provided with an annular groove 17 within which is adapted to be received the rear end of the tubular section B, the parts being rigidly secured together as by the rivets 18—18. To accommodate the retaining bolt usually employed in friction gears and also to form a seat for the inner coil of the spring, said member D is provided with an inwardly extending hollow boss 19 perforated as indicated at 20 to accommodate the bolt.

As is well known, the friction surface of the shell with which directly engage the friction shoes is the part that most quickly wears out and by forming the shell proper as herein described, I am enabled to provide a much simpler casting than has heretofore been used and one which may be molded without the necessity of cores and with a minimum danger of foundry defects. Furthermore, the member A can readily be renewed or replaced at comparatively small expense and the remaining parts retained. By forming the intermediate section B which connects the friction shell proper and follower D, of sheet steel, it may be very cheaply manufactured and at the same time made of sufficient strength to withstand the shocks imposed thereon.

The arrangement is substantial, relatively cheap to manufacture and permits the ready replacement of the member which most quickly wears out.

I claim:

1. As an article of manufacture, a friction gear shell comprising, a cast member provided with a friction surface, a cast end member, and an intermediate sheet metal member extending between and rigidly secured to said cast members.

2. As an article of manufacture, a friction gear shell comprising, a cast annular friction shell proper, a tubular casing secured at one end to said shell proper, and a follower member secured to the opposite end of said casing.

3. As an article of manufacture, a friction gear shell comprising, a cast annular friction shell proper, a rolled sheet metal tubular casing secured at one end to said friction shell proper and a follower member secured to the other end of said casing.

4. As an article of manufacture, a friction gear shell comprising, a cast annular friction shell proper having an annular recess in one end thereof, a tubular casing having one end inserted within said recess, and devices extending through said shell proper and said casing for rigidly uniting the same.

5. As an article of manufacture, a friction gear shell comprising, a cast annular friction shell proper having an annular recess in its inner end, a rolled sheet metal tubular casing having the forward end thereof seated within said annular recess, and devices extending through the friction shell proper and said casing for rigidly uniting the same.

6. As an article of manufacture, a friction gear shell comprising, a cast annular friction shell provided with an annular recess in its inner end, a cast follower member having an annular recess on its forward side, a sheet metal tubular member extending between said castings and having its ends seated in the respective annular recesses, and rivets extending through the over-lapping portions of the castings and said casing for rigidly uniting the parts.

In witness that I claim the foregoing I have hereunto subscribed my name this 19th day of Oct. 1916.

CALVIN B. PATCH.

Witnesses:
  GOLDIE A. BISHOP,
  ELIZABETH M. BRITT.

Copies of this patent may be obtained for five cents each, by addressing the "Commissioner of Patents, Washington, D. C."